(12) United States Patent
Rose et al.

(10) Patent No.: US 8,307,659 B2
(45) Date of Patent: Nov. 13, 2012

(54) NOZZLE WITH GUIDING ELEMENTS

(75) Inventors: Marco Rose, Freiberg (DE); Rene Spieweg, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 821 days.

(21) Appl. No.: 12/318,148

(22) Filed: Dec. 22, 2008

(65) Prior Publication Data
US 2010/0032497 A1 Feb. 11, 2010

(30) Foreign Application Priority Data
Dec. 21, 2007 (DE) .......... 10 2007 063 018

(51) Int. Cl.
*F02K 1/00* (2006.01)
*B64D 33/04* (2006.01)
*B63H 11/10* (2006.01)
(52) U.S. Cl. ............ 60/770; 239/265.11; 239/265.19
(58) Field of Classification Search .......... 60/770, 60/771, 39.5; 239/265.11, 265.19, 265.37, 239/265.43, 265.39; 181/213
See application file for complete search history.

(56) References Cited

U.S. PATENT DOCUMENTS

| | | | | |
|---|---|---|---|---|
| 3,133,412 A | * | 5/1964 | Westley | 239/265.39 |
| 3,153,319 A | * | 10/1964 | Lilley et al. | 239/265.19 |
| 3,174,282 A | | 3/1965 | Harrison | |
| 3,570,769 A | * | 3/1971 | Freeman | 239/265.39 |
| 3,927,522 A | * | 12/1975 | Bryce et al. | 60/264 |
| 3,982,696 A | | 9/1976 | Gordon | |
| 4,401,269 A | * | 8/1983 | Eiler | 239/265.17 |
| 4,422,524 A | | 12/1983 | Osborn | |
| 4,576,002 A | * | 3/1986 | Mavrocostas | 60/262 |
| 5,154,052 A | | 10/1992 | Giffin et al. | |
| 5,450,720 A | * | 9/1995 | Vuillamy et al. | 60/770 |
| 5,520,336 A | * | 5/1996 | Jourdain et al. | 239/265.39 |
| 5,761,900 A | * | 6/1998 | Presz, Jr. | 60/262 |
| 5,884,472 A | * | 3/1999 | Presz et al. | 60/262 |
| 5,924,632 A | * | 7/1999 | Seiner et al. | 239/265.19 |
| 6,016,651 A | * | 1/2000 | Hammond et al. | 60/39.5 |
| 6,314,721 B1 | * | 11/2001 | Mathews et al. | 60/264 |
| 6,786,037 B2 | * | 9/2004 | Balzer | 60/204 |
| 6,935,098 B2 | | 8/2005 | Bardagi et al. | |
| 2002/0121090 A1 | * | 9/2002 | Zysman et al. | 60/770 |

(Continued)

FOREIGN PATENT DOCUMENTS
DE 1015270 9/1957
(Continued)

OTHER PUBLICATIONS
European Search Report dated Aug. 17, 2011 for counterpart European patent application.

*Primary Examiner* — William H Rodriguez
*Assistant Examiner* — Gerald Sung
(74) *Attorney, Agent, or Firm* — Timothy J. Klima; Shuttleworth & Ingersoll, PLC

(57) ABSTRACT

A nozzle includes first guiding elements (10) circumferentially arranged at a nozzle rim (9). To reduce sound emission while keeping flow losses low, second guiding elements (20) are also circumferentially arranged at the nozzle rim (9), with one of the first and second guiding elements (10, 20) being diffuser-type and the other of the first and second guiding elements (10, 20) being nozzle-type and with both types of guiding elements circumferentially alternating with each other.

17 Claims, 4 Drawing Sheets

U.S. PATENT DOCUMENTS

Figure 1:
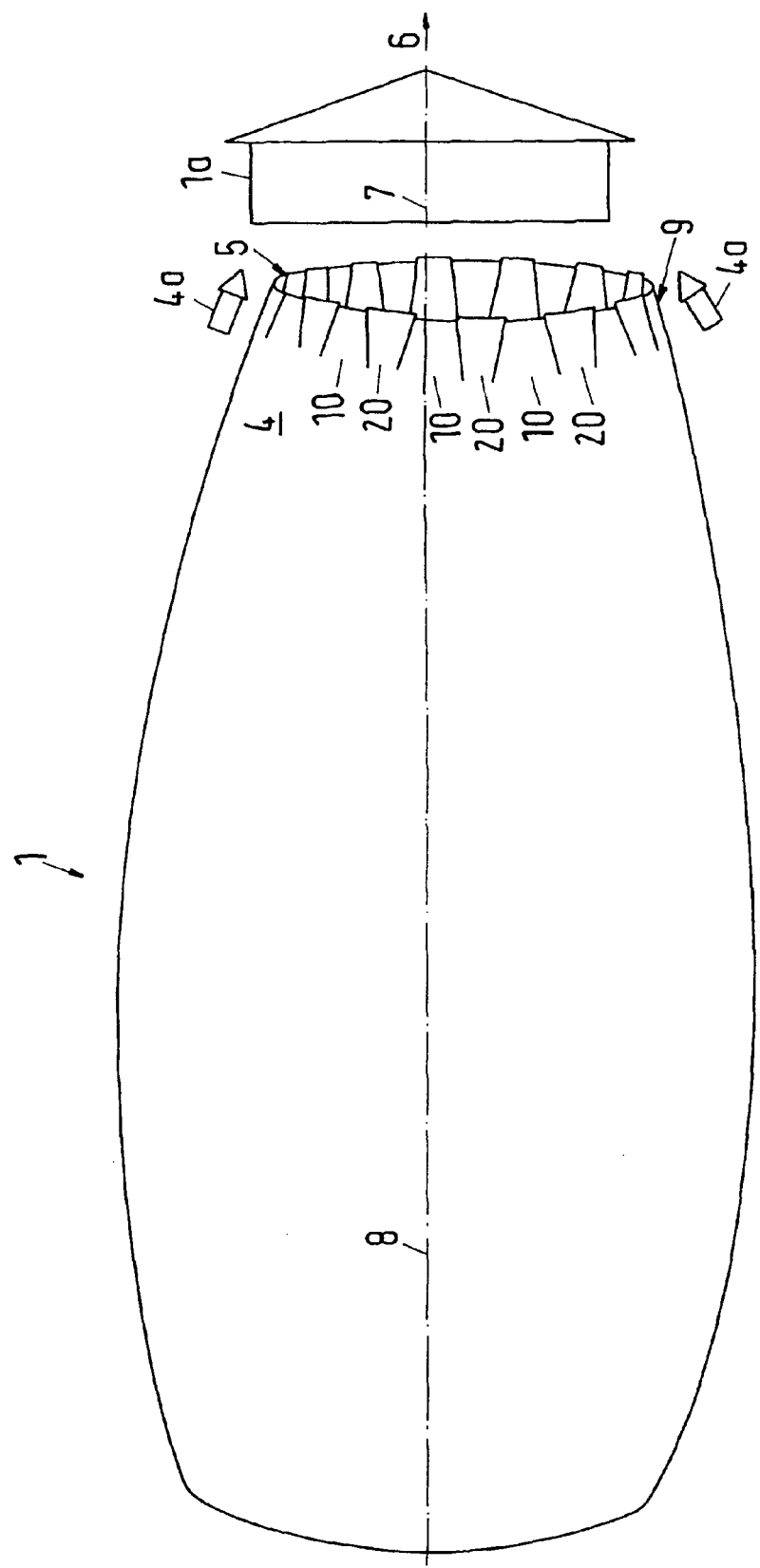

2002/0125340 A1* 9/2002 Birch et al. ............. 239/265.11
2002/0178711 A1* 12/2002 Martens ....................... 60/226.1

FOREIGN PATENT DOCUMENTS

| | | |
|---|---|---|
| DE | 1094529 | 12/1960 |
| DE | 1815830 | 4/1971 |
| DE | 2723639 | 12/1977 |
| DE | 2835902 | 5/1979 |
| DE | 4114319 | 11/1991 |
| DE | 69928476 | 7/2006 |
| EP | 0913568 | 5/1999 |
| EP | 0916834 | 5/1999 |
| GB | 874496 | 8/1961 |
| GB | 889688 | 2/1962 |
| GB | 1535598 | 12/1978 |
| GB | 2355766 | 5/2001 |
| JP | 09-133046 | 5/1997 |
| WO | 03050403 | 6/2003 |

* cited by examiner

NOZZLE WITH GUIDING ELEMENTS

This application claims priority to German Patent Application DE 10 2007 063 018.4 filed Dec. 21, 2007, the entirety of which is incorporated by reference herein.

This invention relates to a nozzle with guiding elements. Furthermore, the present invention relates to an application of the nozzle in a gas turbine and an application in a burner, an ejector and/or a mixing nozzle in process plants.

In particular, during take-off of aircraft, the propulsive jet is a major source of sound. Reduction of jet noise, therefore, constitutes a technological challenge to the aircraft industry. It is characteristic for conventional nozzles with a long bypass nozzle (mixed nozzle configuration) or with a short bypass nozzle (separate/non-mixed nozzle configuration) and smooth jet exit edge at the nozzle rim that, in the concentric jets exiting from the nozzle, very stable, coherent swirl structures form in the shear layers of the free jet which considerably contribute to sound emission.

Application of sound-absorbing measures has to be ruled out since the location of sound generation is situated further downstream of the engine. For abatement of sound emission, the cause of sound emission, as is generally known, can be influenced by suitable approaches. Basically, these include active and passive measures.

In the case of passive measures, the shape of the jet exit edge is not smooth, but circumferentially variable. For example, axially round or angular dentations are here used which are also termed serrations or chevrons. Furthermore, radially inwardly or outwardly curved dentations are known which are commonly designated as corrugations. In addition, nozzles are known whose jet exit edge is beveled.

The dentations are mostly fixed, but can also be variable. Variable dentations are retractable by means of active actuating mechanisms or deformable by applying materials with memory properties. Variable dentations enable sound emission to be reduced, in particular at aircraft take-off. In cruise, the dentations are then settable for small flow losses, enabling fuel to be saved.

Specification GB 2 355 766 A, for example, describes a mixed nozzle configuration for a jet engine with jet exit edges on which trapezoidal baffles are inclined towards the inner side of the individual nozzles. Disposed between the baffles are again trapezoidal or triangular interspaces. The shape and inclination of the baffles causes swirls to form in the flow of the exit jet. However, the baffles and interspaces reduce sound emission to only a small extent.

Further known for the reduction of sound emission is the injector principle in which air is ingested through openings in the nozzle wall which then mixes with the gas in the propulsive jet.

Specification U.S. Pat. No. 3,982,696, for example, discloses a nozzle of a jet engine on whose inner side cross-sectionally curviform elements with baffles inclined towards the inner side are arranged through which air is introduced into the propulsive jet. The air jets mix with the gas of the propulsive jet, thus reducing sound emission.

The described forms of the jet exit edge are used on both single nozzles and nozzles with bypass nozzle.

Active influencing techniques were directly derived from the aforementioned recent passive measures in that moveable forms of the dentations at the nozzle rim were provided. Vibration of the dentation is excited to influence shear instabilities and swirl formation and, thereby, reduce sound emission. This requires additional accessories for operation.

The active measures for the reduction of sound emission also include techniques in which gas, vapor or liquid is injected via small nozzles in the area of the nozzle wall. These solutions are also known as micro jets.

Conventional nozzles with smooth jet exit edge are known for very high sound emission. However, flow losses are lower than on all of the above modifications.

The passive measures with dentations (serrations or chevrons) protruding into the flow, while being efficient with regard to the reduction of sound emission, produce relatively high flow losses which affect engine efficiency.

Variable mechanisms are disadvantageous in that moveable components are involved for which an actuating unit, and thus additional energy, and a control unit will be required. Furthermore, additional weight is incurred. Also, these mechanisms require a high maintenance effort and are complex and expensive.

The above disadvantages also exist with active measures. They are even more pronounced than with passive, variable techniques. Also, practical applicability of materials with memory properties has not yet been demonstrated.

A further, significant disadvantage of both the active and the passive measures lies in the currently proposed shapes of the jet exit edges. It is a physical condition that the reduction of low-frequency jet noise entails an increase of high-frequency jet noise. Thus, total noise reduction is less efficient.

In the design of nozzles for jet engines, it is particularly problematic to reduce the aerodynamic sound generation in the propulsive jet of an aircraft while causing no, or only minimum, deterioration of the aerodynamic properties, such as pressure loss.

In a broad aspect, the present invention provides a nozzle by which sound emission is reduced and, at the same time, flow losses are kept low.

In accordance with the present invention, a nozzle includes first guiding elements circumferentially arranged at the nozzle rim. At the nozzle rim, second guiding elements are also circumferentially arranged, with one of the first and second guiding elements being diffuser-type and the other of the first and second guiding elements being nozzle-type and with both types of guiding elements circumferentially alternating with each other.

The nozzle-type and diffuser-type guiding elements create areas in which the flow is locally accelerated or retarded, respectively. With this design of the first and second guiding elements, the outflowing medium is swirled at the nozzle rim, where the outflowing medium meets the surrounding medium, by simple and robust means. Imparting additional swirl intensity by local flow acceleration or deceleration, respectively, promotes the mixing process, with the pressure losses resulting from the geometric variation of the first and second guide vanes being minimized. Accordingly, the first and second guiding elements improve the ratio of noise reduction and flow losses.

The first and second guiding elements require little maintenance, are cost-effective and weight-neutral or lightweight. Dispensing with moving parts, no additional mechanism with energy supply and control is required.

The first guiding elements each include two wall elements which are inclined to the flow direction and are connected to the respective adjacent second guiding elements and separate the diffuser and nozzle flows at the nozzle rim. The wall elements enable precise local flow acceleration or deceleration, respectively, at the nozzle rim, thus obtaining defined swirling with low flow losses.

The guiding elements form trapezoids which alternately converge or diverge in the direction of flow. Since the guiding elements are trapezoidal, nozzle-type and diffuser-type sections are formed and the exit jet is optimally accelerated or retarded, respectively, at the nozzle rim.

The first guiding elements and/or the second guiding elements can be plane. Plane guiding elements are easily manufacturable.

Alternatively, the first guiding elements and/or the second guiding elements can be outwardly curved. This geometry is also easily manufacturable, with guiding elements with outward curvature providing for better flow conduit.

Preferably, the edge angles β of the second guiding elements and the edge angles β of the adjacent first guiding elements are equal relative to the respective centerlines, and the wall elements are essentially perpendicular to the second guiding elements. The equal edge angles of the first and second guiding elements and the vertical walls facilitate manufacture of the nozzle.

In particular, the guiding elements can be symmetrical. Symmetry of the guiding elements provides for uniform swirling with low flow losses. Also, manufacture is further facilitated.

Preferably, the edge angles β of the guiding elements relative to the respective centerlines lie between 0° and 15°. This angular range provides for optimum mixing of the partial flows at the first and the second guiding elements while avoiding too high flow losses.

In particular, the second guiding elements are radially inwardly or radially outwardly inclined. Inclination of the second guiding elements further enhances swirling of the outflowing medium with the surrounding medium.

Preferably, inclination of the guiding elements relative to a centerline which tangentially adjoins the nozzle surface is between 0° and 15°. These inclinations provide for both good swirling and low flow losses.

Preferably, the first and second guiding elements form a plane jet exit edge. Thus, the flow in the first and second guiding elements is locally swirled at the same level in the direction of flow, thereby keeping flow losses low.

Preferably, the edges between the nozzle surface and the first guiding elements and/or the second guiding elements are rounded. Such rounding improves flow conduit.

Furthermore, at least one part of the angular edges of the first guiding elements and/or the second guiding elements can be rounded in circumferential direction of the nozzle. Such rounding additionally improves flow conduit.

Preferably, the first guiding elements and/or the second guiding elements are formed from segments of the nozzle surface. The segments can, for example, be formed from the nozzle surface by cutting or bending, this providing for easy and cost-effective manufacture.

Alternatively, the first guiding elements and/or the second guiding elements can be attached to the nozzle surface. Separate manufacture and subsequent attachment of the first and second guiding elements to the nozzle surface enables conventional nozzles to be retrofitted.

In a particular development of the present invention, the nozzle rim with the jet exit edge is beveled. A beveled rim serves the reduction of sound emission, which can even further be abated by the first and second guiding elements.

In a further advantageous development of the present invention, the nozzle may include a core-flow nozzle and a bypass-flow nozzle, with at least the core-flow nozzle or the bypass-flow nozzle being provided with the first and second guiding elements. A nozzle with a core-flow nozzle and a bypass-flow nozzle produces an increase in sound emission, so that the provision of the first and second baffles is here particularly favorable for sound emission abatement.

The nozzle is particularly advantageous in gas-turbine applications since the reduction of sound emission is here essential for environmental protection. In particular, in the case of jet engines, the passengers and the crew require protection against noise.

With the nozzle according to the present invention, low-frequency noise is efficiently reduced. Moreover, the nozzle involves no, or only minor, increase in high-frequency noise and features no, or only minor, flow losses. The invention is applicable to both short nozzles ("short cowl", "separate jets", "½ cowl", "¾ cowl") and long nozzles ("long cowl", "mixed jets").

Furthermore the nozzle may be used in a burner, an ejector or a mixing nozzle in process plants. Reduction of sound emission is also advantageous in process plants to protect environment and operating personnel.

Figure 3:
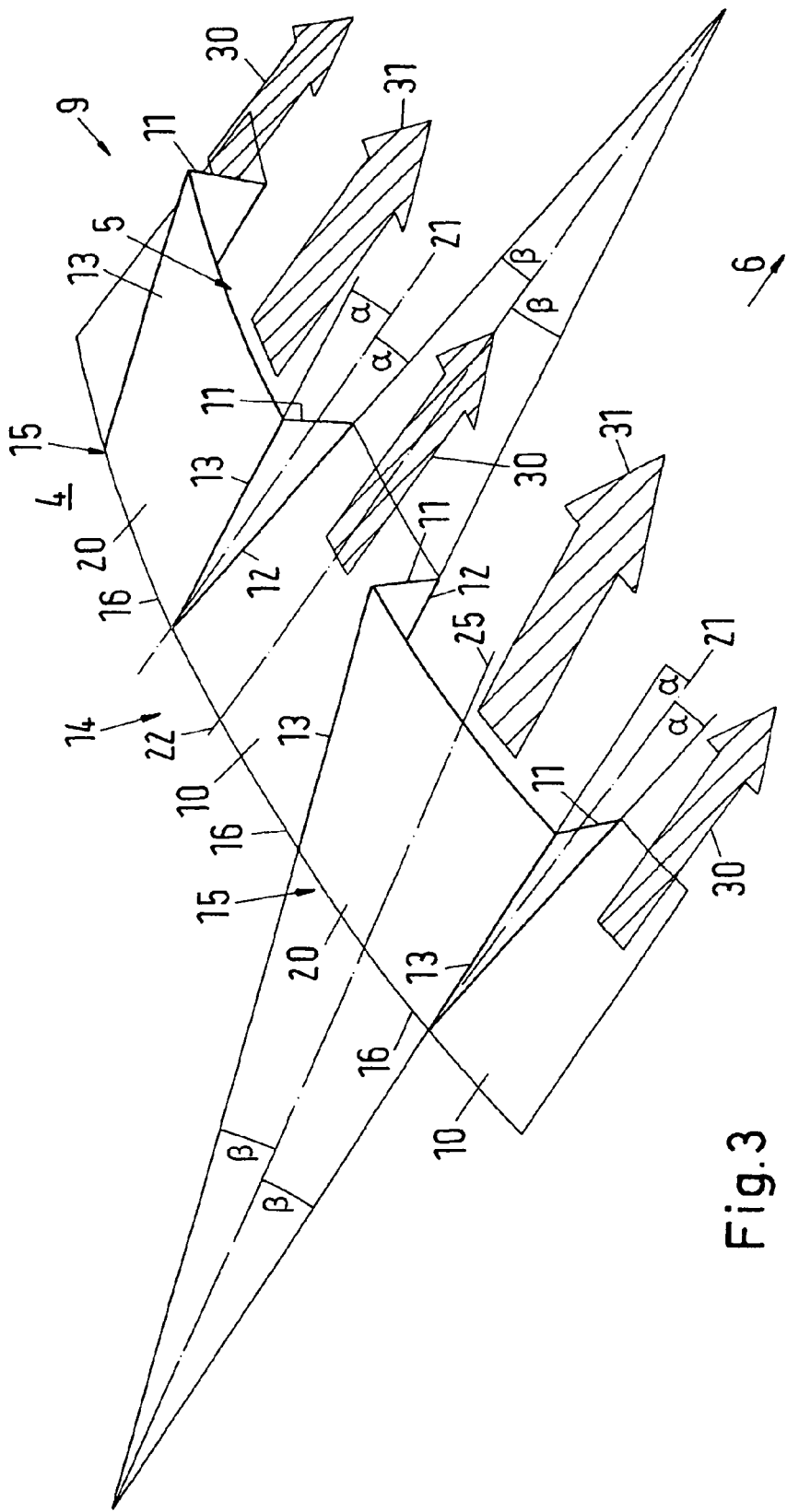
Figure 4:
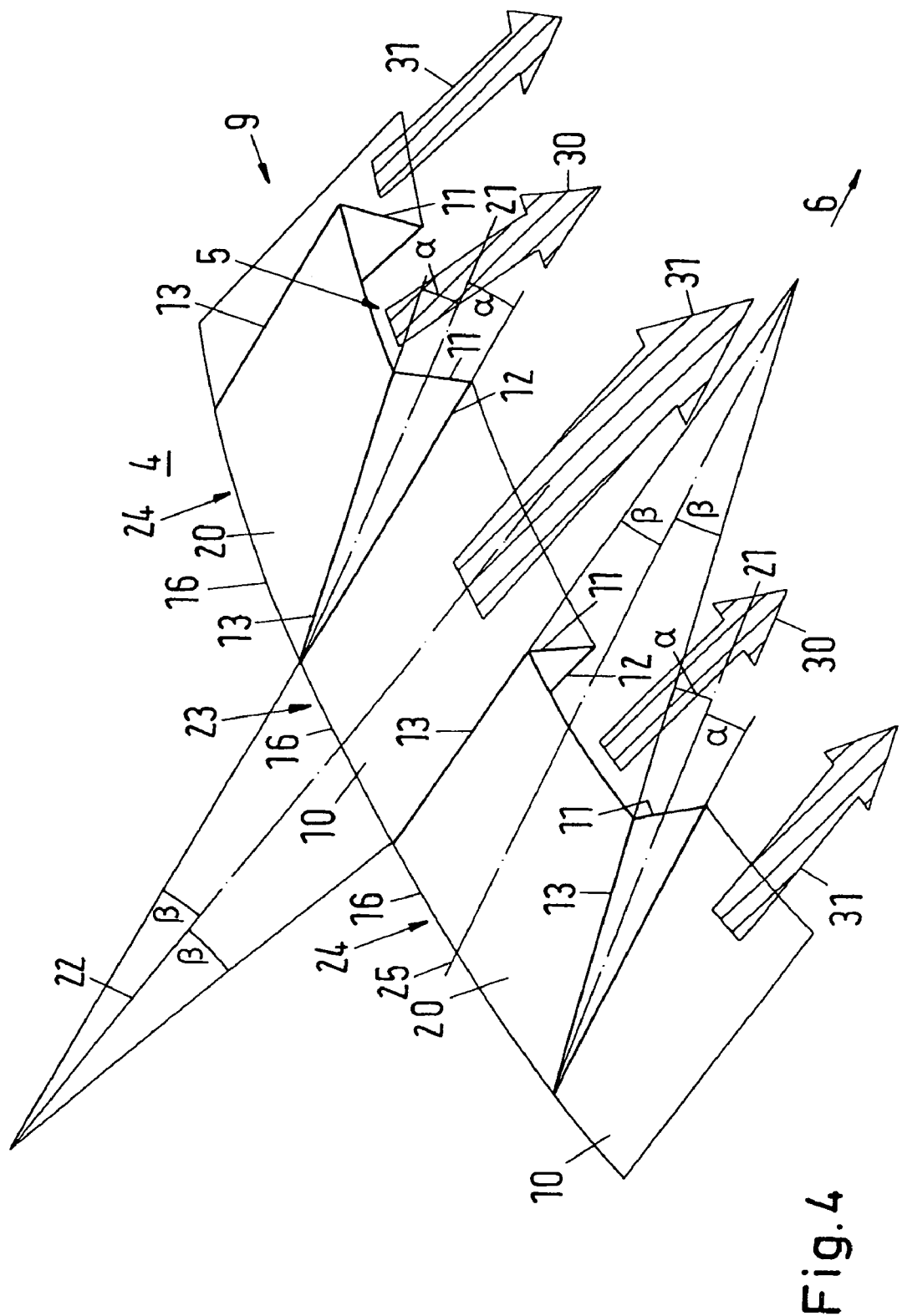

The present invention is more fully described in light of the accompanying drawings showing two different embodiments of the nozzle in accordance with the present invention. In the drawings, FIG. 1 is a perspective view of the first embodiment of the nozzle, FIG. 2 is a perspective view of the second embodiment of the nozzle, FIG. 3 is a perspective detailed view of the first and second guiding elements of the nozzles as per FIGS. 1 and 2, and FIG. 4 is a perspective detailed view of alternative first and second guiding elements of the nozzles as per FIGS. 1 and 2.

FIG. 1 shows a nozzle 1 with a nozzle surface 4 as well as first guiding elements 10 and second guiding elements 20 at a nozzle rim 9 with a jet exit edge 5. The first guiding elements 10 converge in flow direction 6 and are radially inwardly inclined, while the second guiding elements 20 diverge in flow direction 6 and are radially outwardly inclined. The jet axis 7 is an extension of the centerline 8 of the nozzle 1 in flow direction 6.

In operation, a propulsive jet 1a exits from the nozzle 1 at the jet exit edge 5. An outer flow 4a passes along the nozzle surface 4.

Figure 2:
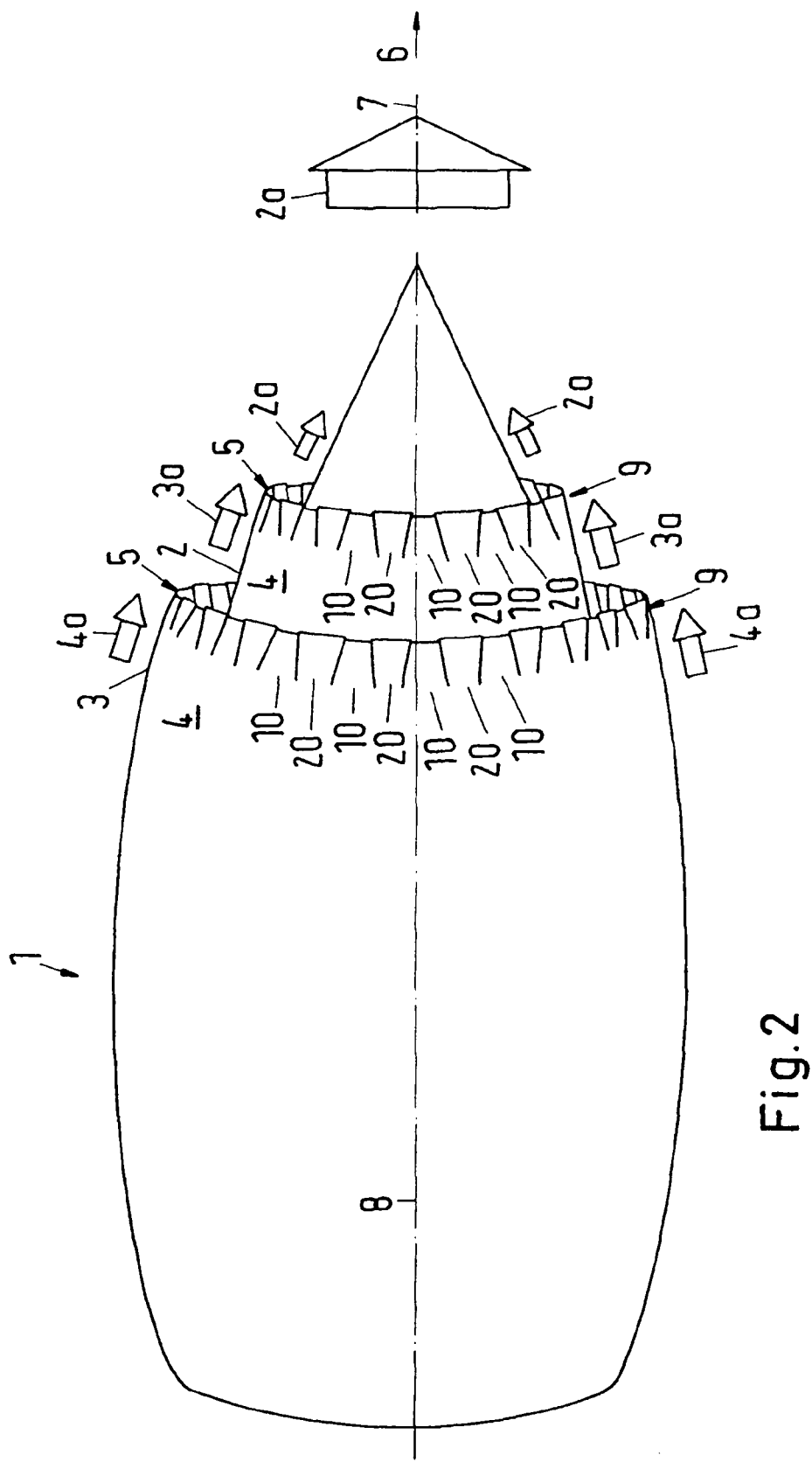

FIG. 2 shows a nozzle 1 which includes a core-flow nozzle 2 and a bypass-flow nozzle 3. The core-flow nozzle 2 and the bypass-flow nozzle 3 each have a nozzle surface 4 with a jet exit edge 5 and first guiding elements 10 and second guiding elements 20 at nozzle rims 9 with appertaining jet exit edges 5. As in FIG. 1, the first guiding elements 10 converge in flow direction 6 and are radially inwardly inclined, while the second guiding elements 20 diverge in flow direction 6 and are radially outwardly inclined. The jet axis 7 is an extension of the centerline 8 of the nozzle 1 in flow direction 6.

In operation, a hot core flow 2a exits from the core-flow nozzle 2. A cold bypass flow 3a exits from the bypass-flow nozzle 3. The outer flow 4a passes along the nozzle surface 4 of the bypass-flow nozzle 3.

FIG. 3 is a detailed view of the nozzle rim 9 with the first guiding elements 10 and the second guiding elements 20 of FIGS. 1 and 2.

The nozzle rim 9 is formed by first guiding elements 10 and second guiding elements 20. The first guiding elements 10 each include two edges 12, two wall elements 11 adjoining the edges 12, and a circumferential edge 16 adjoining the nozzle surface 4. The first guiding elements 10 are each radially inwardly inclined by the angle α relative to the respective centerlines 21 tangentially adjoining the nozzle surface 4. Angle α lies between 0° and 15°. In flow direction, the two edges 12 each extend symmetrically to the centerlines 22 of the first guiding elements 10 at angles β, so that the edges 12 uniformly converge in flow direction. Angle β lies between 0° and 15°. Thus, the first guiding elements 10 flare trapezoidally in flow direction. The first guiding elements 10 including the wall elements 11 thus form nozzles 14, whose cross-section in circumferential direction is a radially outwardly open rectangle.

The wall elements 11 of the first guiding elements 10 are triangular, each adjoining the edges 12 and extending, in flow direction, symmetrically relative to the centerlines 22 of the first guiding elements at angles β. Also, the wall elements 11 of the first guiding elements 10 perpendicularly adjoin the edges 13 of the two adjacent second guiding elements 20 each.

The second guiding elements 20 each include two edges 13 and a circumferential edge 16 adjoining the nozzle surface 4. The second guiding elements 20 are each inclined relative to the respective centerlines 21 also by the angle α as in the case of the first guiding elements 10, however not radially inwardly as the first guiding elements 10, but radially outwardly. However, the second guiding elements 20 can have no inclination and, instead, form part of the nozzle surface 4. In addition, the edges 13 of the second guiding elements 20 extend toward the respective centerlines 25 at the same angle β as the edges 12 of the adjacent first guiding elements 10 relative to the centerlines 22. Together with the wall elements 11 of the first guiding elements 10, the second guiding elements 20 each form a diffuser 15, whose cross-section in circumferential direction is a radially inwardly open rectangle.

Accordingly, the nozzle rim 9 is not smooth as with conventional nozzles, but configured as specially formed, open nozzles 14 and diffusers 15. The first guiding elements 10 with the wall elements 11 and the second guiding elements 20 also form the jet exit edge 5 whose cross-section has the form of a dentated circle.

In operation of the nozzle 1 as per FIG. 1, the outer flow 4a is locally accelerated in the nozzles 14 and simultaneously guided inwards towards the jet axis 7 in the direction of the propulsive jet 1a, thus producing the nozzle flow 30. In contrast, the propulsive jet 1a is locally retarded in the diffusers 15 and simultaneously guided outwards in the direction of the outer flow 4a, thus producing the diffuser flow 31.

In operation of the nozzle 1 as per FIG. 2, the outer flow 4a is locally accelerated in the nozzles 14 of the bypass-flow nozzle 3 and simultaneously guided inwards towards the jet axis 7 in the direction of the bypass flow 3a, thus producing the nozzle flow 30. In contrast, the bypass flow 3a is locally retarded in the diffusers 15 and simultaneously guided outwards in the direction of the outer flow 4a. Furthermore, the bypass flow 3a is locally accelerated in the nozzles 14 of the core-flow nozzle 2 and guided in the direction of the core flow 2a. The core flow 2a is locally retarded in the diffusers 15 and guided outwards in the direction of the bypass flow 3a, thus producing the diffuser flow 31.

FIG. 4 shows a detailed view of alternative first and second guiding elements 10, 20.

Here again, the nozzle rim 9 is formed by first guiding elements 10 and second guiding elements 20. The first guidings 10 each include two edges 12, two wall elements 11 adjoining the edges 12, and a circumferential edge 16 adjoining the nozzle surface 4. The first guiding elements 10 are each radially inwardly inclined by the angle α relative to the respective centerlines 21 which tangentially adjoin the nozzle surface 4. Angle α lies between 0° and 15°. In flow direction, the two edges 12 each extend symmetrically to the centerlines 22 of the first guiding elements 10 at angles β, so that the edges 12 uniformly diverge in flow direction, instead of converging as in FIGS. 1 to 3. Angle β lies between 0° and 15°. Thus, the first guiding elements 10 flare trapezoidally in flow direction. The first guiding elements 10 including the wall elements 11 thus form diffusers 23, not nozzles 14 as in FIGS. 1 to 3, whose cross-section in circumferential direction is a radially outwardly open rectangle.

The wall elements 11 of the first guiding elements 10 are triangular, each adjoining the edges 12, as shown in FIG. 3, and extending, in flow direction, symmetrically relative to the centerlines 22 of the first guiding elements at angles β. Also, the wall elements 11 of the first guiding elements 10 perpendicularly adjoin the edges 13 of the two adjacent second guiding elements 20 each.

The second guiding elements 20 each include two edges 13 and a circumferential edge 16 adjoining the nozzle surface 4. The second guiding elements 20 are each inclined relative to the respective centerlines 21, as shown in FIG. 3, by the angle α as the first guiding elements 10, however not radially inwardly as the first guiding elements 10, but radially outwardly. However, the second guiding elements 20 can, here again, have no inclination and, instead, form part of the nozzle surface 4. In addition, the edges 13 of the second guiding elements 20 extend to the respective centerlines 25 at the same angle β as the edges 12 of the adjacent first guiding elements 10 relative to the centerlines 22. Together with the wall elements 11 of the first guiding elements 10, the second guiding elements 20 form nozzles 24, not diffusers 15 as in FIGS. 1 to 3, whose cross-section in circumferential direction is a radially inwardly open rectangle.

Accordingly, the nozzle rim 9 is not smooth as with conventional nozzles, but configured as specially formed, open diffusers 23 and nozzles 24. The first guiding elements 10 with the wall elements 11 and the second guiding elements 20 also form, as shown in FIG. 3, the jet exit edge 5 whose cross-section, as above, has the form of a dentated circle.

The first guiding elements 10 and the second guiding elements 20 can be formed from the nozzle surface 4 or be separately provided as retrofit kit for attachment to the nozzle surface 4 of conventional nozzles 1.

In operation of the nozzle 1 as per FIG. 1, the outer flow 4a is locally retarded in the diffusers 23 and simultaneously guided inwards towards the jet axis 7 in the direction of the propulsive jet 1a, thus producing the diffuser flow 31. In contrast, the propulsive jet 1a is locally accelerated in the nozzles 24 and simultaneously guided outwards in the direction of the outer flow 4a, thus producing the nozzle flow 30.

In operation of the nozzle 1 as per FIG. 2, the outer flow 4a is locally retarded in the diffusers 23 of the bypass-flow nozzle 3 and simultaneously guided inwards towards the jet axis 7 in the direction of the bypass flow 3a, thus producing the diffuser flow 31. In contrast, the bypass flow 3a is locally accelerated in the nozzles 24 and simultaneously guided outwards in the direction of the outer flow 4a. Furthermore, the bypass flow 3a is locally retarded in the diffusers 23 of the core-flow nozzle 2 and guided in the direction of the core flow 2a. The core flow 2a is locally accelerated in the nozzles 24 and guided outwards in the direction of the bypass flow 3a, thus producing the nozzle flow 30.

With both an arrangement of the guiding elements 10, 20 as per FIG. 3 and an arrangement of the guiding elements 10, 20 as per FIG. 4, the flow in the area of the jet exit edge is influenced such that the jet noise is reduced on the basis of the following functional mechanism.

The main cause of the noise produced by the propulsive jet 1a, or the core flow 2a and the bypass flow 3a, respectively, are the stable, coherent structures resulting from the velocity difference between the respective inner flows 1a, 2a, 3a and outer flows 3a, 4a. The swirl intensity underlying these flows 1a, 2a, 3a, 4a is generally vertically directed to the flow direction 6 and the direction of maximum velocity difference, thus extending generally in circumferential direction of the nozzle 1, or the core-flow nozzle 2 and the bypass-flow nozzle 3, respectively. The ring swirls so produced characteristically are stable in themselves and produce large pressure fluctuations, i.e. noise.

With the flow (nozzle flow 30, diffuser flow 31) issuing from the nozzle rim 9 in the area of the jet exit edge 5 being locally accelerated and retarded by the nozzles 14, 24 and the diffusers 15, 23, variation of the axial velocity in circumferential direction is obtained. Consequently, axial and radial swirls are generated downstream of the nozzle 1, or the core-flow nozzle 2 and the bypass-flow nozzle 3, respectively, which interact with the stable ring swirls. These finally deform and destroy themselves by self-induction. This provides for increased impulse exchange, i.e. for better, more homogenous mixing of the inner flow 1a, 2a, 3a and the outer flow 3a, 4a. The large swirl structures producing low-frequency noise are broken into small swirl structures whose emitted high-frequency noise dissipates more rapidly and is atmospherically dampened. Accordingly, weakening the large, circumferentially coherent swirl structures ultimately leads to reduced noise generation in the propulsive jet 1a, or in the core flow 2a and the bypass flow 3a, respectively.

The nozzles 14, 24 and the diffusers 15, 23 formed by the first and second guiding elements 10, 20 produce crossed shear layers which lead to incoherence of the swirl structures in circumferential direction. Coherent swirl structures are stable and constitute the main part of jet noise generation. Breaking up the coherence weakens the sound generation mechanism, and less noise is produced, and emitted, in the jet/flows 1a, 2a and 3a. The specific geometry of the nozzle rim 9 provides for both particularly high efficiency of noise abatement and low aerodynamic losses.

List Of Reference Numerals
1 Nozzle
1a Propulsive jet
2 Core-flow nozzle
2a Core flow
3 Bypass-flow nozzle
3a Bypass flow
4 Nozzle surface
4a Outer flow
5 Jet exit edge
6 Flow direction
7 Jet axis
8 Centerline
9 Nozzle rim
10 First guiding elements
11 Wall elements
12 Edge
13 Edge
14 Nozzle
15 Diffuser
16 Edge
20 Second guiding elements
21 Centerline
22 Centerline
23 Diffuser
24 Nozzle
25 Centerline
α Inclination angle
β Edge angle
30 Nozzle flow
31 Diffuser flow

What is claimed is:

1. A nozzle, comprising:
   a nozzle rim;
   a plurality of first guiding elements circumferentially arranged at the nozzle rim;
   a plurality of second guiding elements circumferentially arranged at the nozzle rim, with one of the first and second guiding elements being diffuser-type and the other of the first and second guiding elements being nozzle-type and with both types of guiding elements circumferentially alternating with each other;
   wherein the diffuser-type guiding elements each have two substantially radially extending and planar side walls circumferentially diverging in a flow direction from an upstream entry area to a downstream exit area with the two diffusing side walls forming an angle with respect to one another having a vertex upstream of the diffuser-type guiding element;
   wherein the nozzle-type guiding elements each have two substantially radially extending and planar side walls circumferentially converging in a flow direction from an upstream entry area to a downstream exit area with the two converging side walls forming an angle with respect to one another having a vertex downstream of the nozzle-type guiding element.

2. The nozzle of claim 1, wherein the first guiding elements each include two wall elements forming the side walls which are inclined toward a flow direction and are connected to respective adjacent second guiding elements to separate diverging and converging flows at the nozzle rim.

3. The nozzle of claim 1, wherein the first and second guiding elements are in the form of trapezoids which alternately converge and diverge in a direction of flow.

4. The nozzle of claim 3, wherein at least one of the first guiding elements and the second guiding elements are formed of planar surfaces.

5. The nozzle of claim 3, wherein at least one of the first guiding elements and the second guiding elements include outwardly curved surfaces.

6. The nozzle of claim 2, wherein edge angles β of the second guiding elements and edge angles β of adjacent first guiding elements are equal relative to respective centerlines thereof, and in that the wall elements are essentially perpendicular to the second guiding elements.

7. The nozzle of claim 6, wherein the first and second guiding elements are symmetrical.

8. The nozzle of claim 7, wherein the edge angles β of the first and second guiding elements relative to the respective centerlines are between 0° and 15°.

9. The nozzle of claim 8, wherein one of the first and second guiding elements are radially inwardly inclined and the other of the first and second guiding elements are radially outwardly inclined.

10. The nozzle of claim 9, wherein the inclination of the first and second guiding elements relative to a centerline, which tangentially adjoins the nozzle surface, is between 0° and 15°.

11. The nozzle of claim 10, wherein the first and second guiding elements form a planar jet exit edge.

12. The nozzle of claim 11, wherein a circumferential edge between a nozzle surface and at least one of the first and second guiding elements is rounded.

13. The nozzle of claim 12, wherein each of the first and second guiding elements has boundary edges and at least a part of the boundary edges of at least one of the first and second guiding elements are rounded in a circumferential direction of the nozzle.

14. The nozzle of claim 13, wherein at least one of the first and second guiding elements are formed from segments of the nozzle surface.

15. The nozzle of claim 13, wherein at least one of the first and second guiding elements are separately formed components attached to the nozzle surface.

16. The nozzle of claim 15, wherein the nozzle includes a core-flow nozzle and a bypass-flow nozzle, with at least one of the core-flow nozzle and the bypass-flow nozzle including the first and second guiding elements.

17. The nozzle of claim 1 in a gas turbine.

* * * * *